Figure 4:
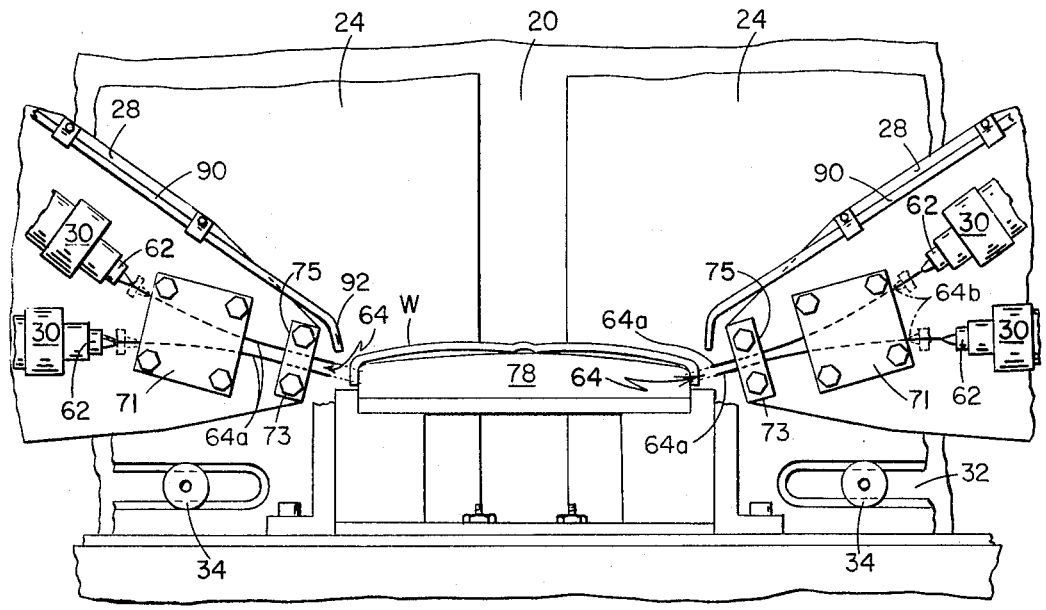

Nov. 22, 1966   J. J. L. JODOIN   3,286,554
DRILLING APPARATUS
Filed March 27, 1964   4 Sheets-Sheet 1
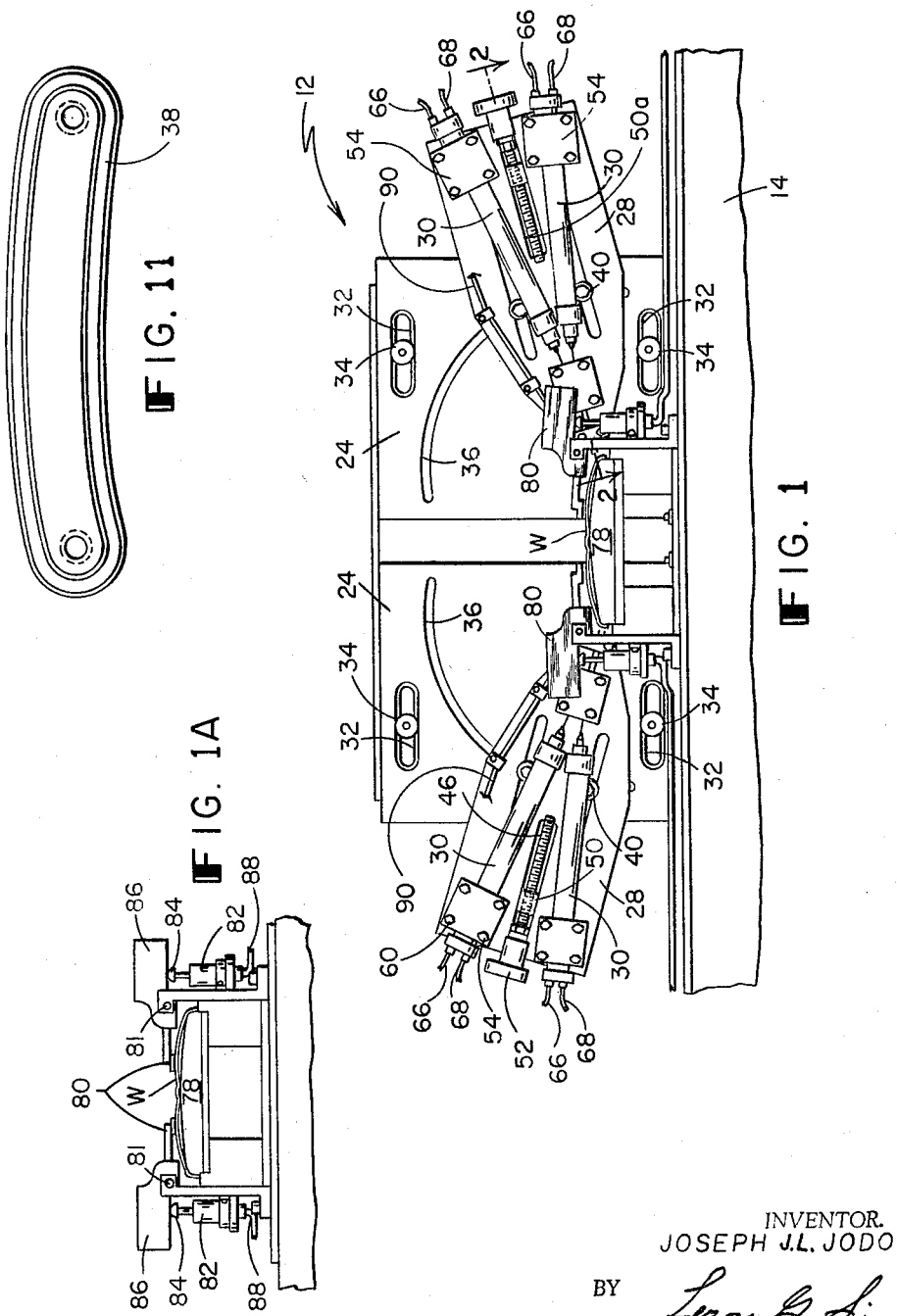
INVENTOR.
JOSEPH J.L. JODOIN
BY
*Leroy G. Linn*
ATTORNEY.

Nov. 22, 1966 J. J. L. JODOIN 3,286,554
DRILLING APPARATUS
Filed March 27, 1964 4 Sheets-Sheet 2
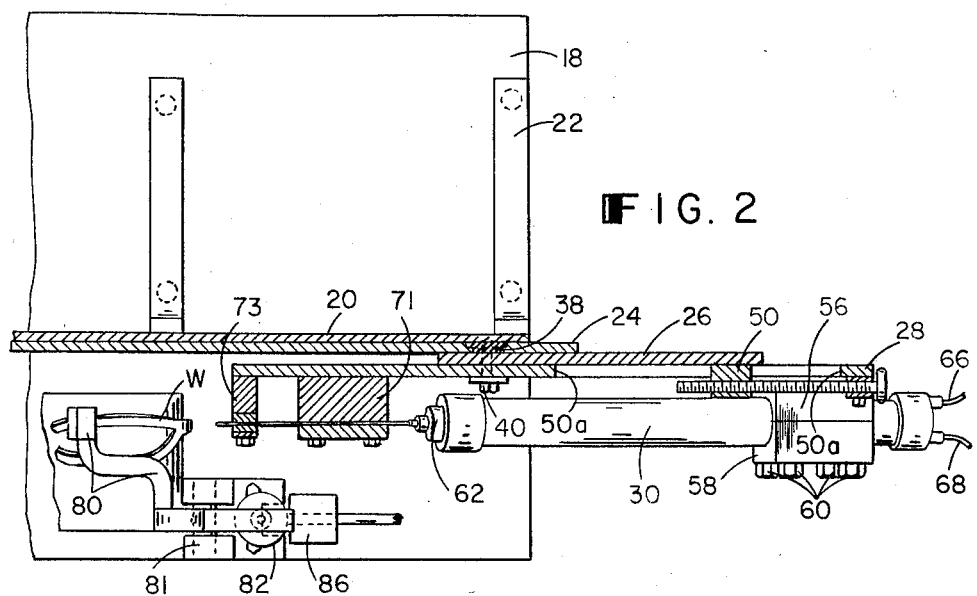
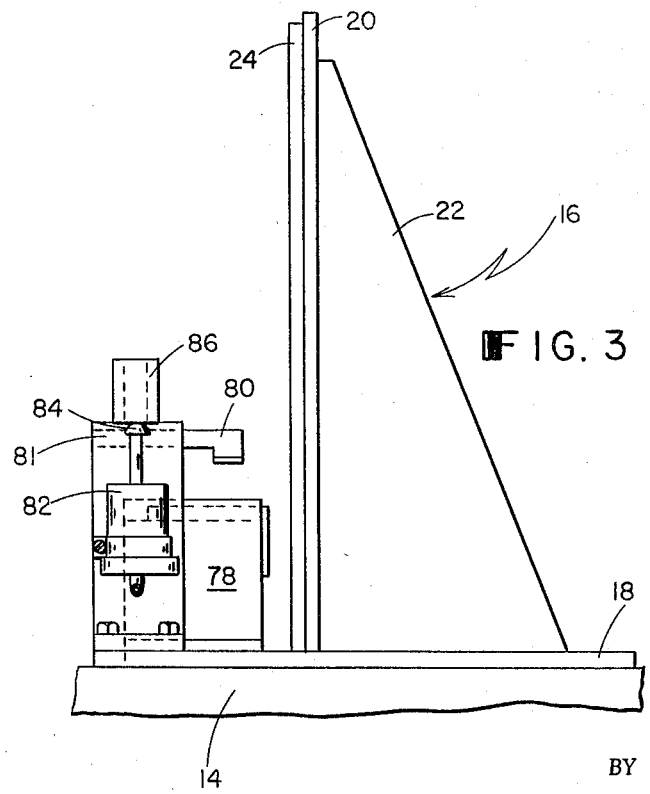
INVENTOR.
JOSEPH J.L. JODOIN
BY
ATTORNEY INVENTOR.
JOSEPH J.L. JODOIN
BY
*Larry E. Linn*
ATTORNEY Nov. 22, 1966  J. J. L. JODOIN  3,286,554
DRILLING APPARATUS
Filed March 27, 1964  4 Sheets-Sheet 4
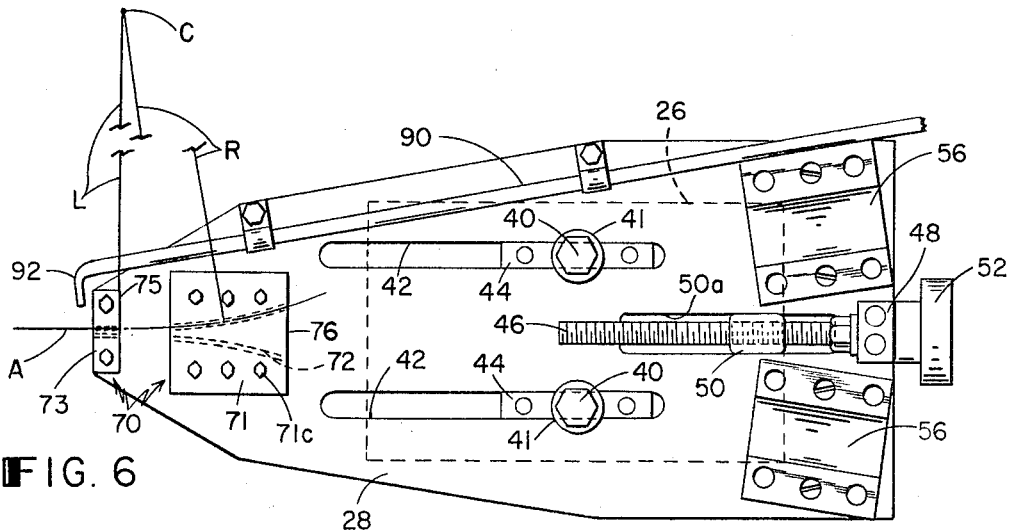
FIG. 6
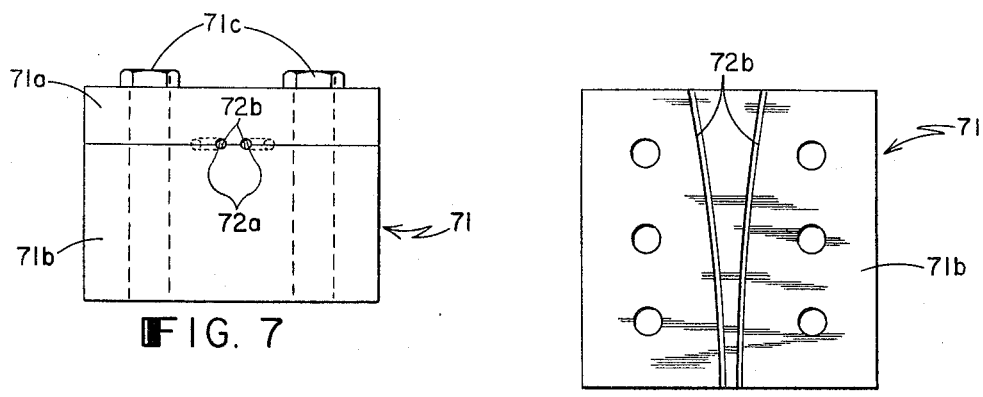
FIG. 7
FIG. 8
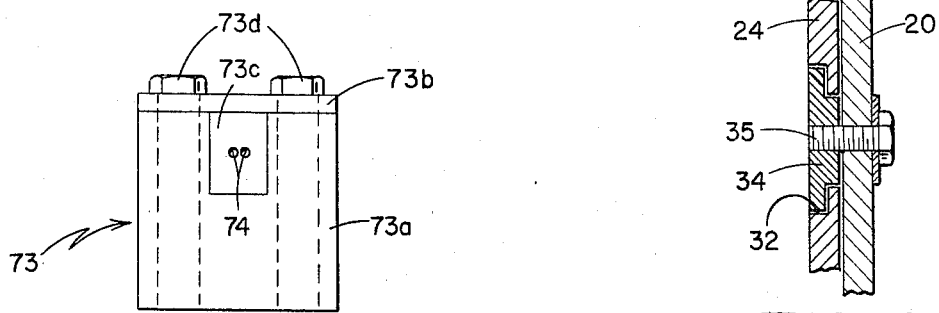
FIG. 9
FIG. 10
INVENTOR.
JOSEPH J. L. JODOIN
BY Leroy G. Linn
ATTORNEY.

United States Patent Office 3,286,554
Patented Nov. 22, 1966

3,286,554
DRILLING APPARATUS
Joseph J. L. Jodoin, West Townsend, Mass., assignor to Foster Grant Co., Inc., Leominster, Mass., a corporation of Delaware
Filed Mar. 27, 1964, Ser. No. 355,373
3 Claims. (Cl. 77—22)

This invention relates to apparatus for use in drilling, and more particularly to a mechnism which facilitates the drilling or machining of a plurality of closely spaced holes.

The invention is especially adapted for use in drilling operations wherein a plurality of holes are to be drilled on very close centers. Heretofore, these holes were drilled sequentially due to the fact that the drills generally available are of such width as to prohibit the use of multiple drills operating simultaneously to drill a plurality of closely spaced holes. The invention could also be used in other machining operations for example tapping, sizing, lapping, broaching and other similar operations.

It is, therefore, an object of this invention to provide apparatus by which holes can be machined on very close centers.

It is a further object of this invention to provide apparatus by which a plurality of drill bits are guided relative to each other so that the drilling portions of said bits are spaced on very close centers.

It is a further object of this invention to provide a guide for drill bits to guide and bend the drill bits so that the drilling axes thereof are angularly displaced with respect to the chuck axes.

It is a further object of this invention to provide a drill guide which serves to guide and bend the drill bit at the same time serving as a heat sink to dissipate heat generated by the friction between the rotating drill bits and the walls of the guideways in the drill guide.

It is a further object of this invention to provide a drill guide which serves to bend a plurality of converging drill bits relative to one another so that the drilling axes thereof are disposed substantially parallel to each other on very close centers. The term substantially parallel contemplates embodiments wherein the drills are diverging slightly in drilling position as well as those wherein the drills are bent into parallel relationship.

It is a further object of this invention to provide a drilling apparatus which permits drilling a plurality of holes on much closer centers would be possible if the drills were placed side by side in parallel relationship.

It is a further object of this invention to provide adjustable mechanism which is capable of automatically and simultaneously drilling a plurality of closely spaced holes so as to insure close tolerances in the finished product.

The foregoing and other objects are achieved in a drilling apparatus wherein a plurality of drills are mounted adjacent one another. Adjacent the chucks of the drills is a drill guide which serves to bend the drill bits into substantially parallel relationship on very close centers, much closer than would be possible if the drills were spaced in parallel contiguous relationship to each other.

Other objects and features of the invention will become apparent by reference to the following specification and drawings.

In the drawings:
FIG. 1 is a front elevation of the drilling apparatus.
FIG. 1A is a detailed front elevation of the clamping mechanism.
FIG. 2 is a cross section taken on lines 2—2 of FIG. 1, the section line being taken through the lower guideways of the guide blocks.

Figure 5:
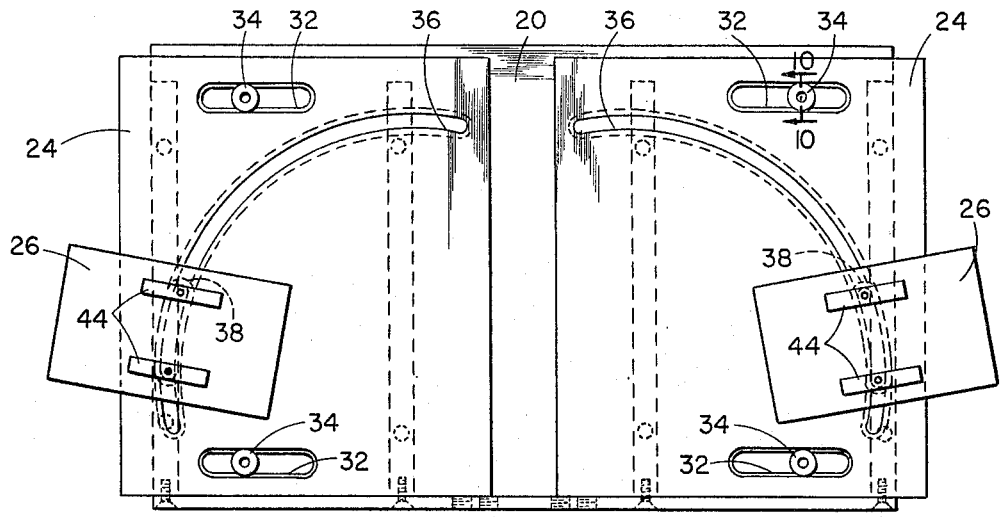

FIG. 3 is a side elevation of the drill support with the front supporting plate, drill mount, and drills removed.
FIG. 4 is a front view of a portion of the drilling apparatus on an enlarged scale. The clamps are not shown in the FIGURE for purposes of clarity.
FIG. 5 is an elevation view of the front and rear support plates and mounting plate.
FIG. 6 is a front elevation of a drill mounting plate with the drills removed.
FIG. 7 is an end view of one of the drill guide blocks for guiding the drill bits.
FIG. 8 is a top view of the drill guide block of FIG. 7 with the cap portion removed.
FIG. 9 is an end view of the second guide block for guiding the drill bits.
FIG. 10 is a section taken on lines 10—10 of FIG. 5.
FIG. 11 is an elevation view of the clamp slide.

More specifically, the drilling apparatus, designated generally at 12, is mounted on a bench 14.

The supporting assembly 16 for the drilling mechanism includes a base 18 carrying an upstanding mounting plate 20 reinforced by gussets 22 (FIG. 3). Slidably attached to the mounting plate 20 are a pair of rear supporting plates 24. On each rear supporting plate 24, is mounted a front supporting plate 26. A drill mount 28 is attached to each of said front supporting plates 26 and a pair of drills 30 are mounted on each of said drill mounts 28.

In order to provide for adjustment of the drills 30, the rear supporting plates 24 are provided with horizontal slots 32 adapted to slidably receive clamp heads 34 threaded on bolts 35. The rear supporting plates 24 are also provided with arcuate slots 36. The front supporting plates 26 are slidably mounted on the rear supporting plates 24 by means of curved clamp slides 38 threaded on bolts 40 and slidably mounted in arcuate slots 36. The bolts 40 and washers 41 also serve to lock the drill mount 28 on front supporting plate 26. Thus, it will be seen that the drills can be adjusted towards and away from each other by sliding the rear support plates 24 on clamps 34. The drills are mounted for angular adjustment by moving the front supporting plates 26 along slots 36; and a longitudinal adjustment is provided through the medium of slots 42 on the drill mount 28, said slots 42 riding on guides 44 attached to front support plate 26. This longitudinal adjustment is effected by screw 46 rotatably but nonaxially mounted in bushing 48 attached to drill mount 28. The screw 46 is threaded in adjusting block 50 which is rigidly attached to front support plate 26. When the screw 46 is rotated by handle 52, the drill mount 28 is moved along guides 44. The drill mount 28 is locked in position with respect to front supporting plate by means of bolts 40 and washers 41 which also serve to lock the front supporting plates 26 against arcuate movement.

The drills 30 are removably secured to the drill mount 28 by means of split blocks 54 having a portion 56 attached to the drill mount and a portion 58 adapted to be removably secured to portion 56 by means of threaded bolts 60.

The drills 30 may be standard turbine drills having a fluid actuated turbine and a piston to extend and retract the chucks 62 and drill bits 64. The actuating fluid is carried by lines 66, 68. By way of example, the drills of the presently preferred embodiment are of type sold under the trademark Bantamatic by the Aro Corporation of Bryan, Ohio, and rotate at a speed of 20,000 r.p.m. The diameter of the largest cross sectional portion of these drills is 1.50 inches.

The drills 30 are secured to the drill mounts 28 in pairs. They are preferably but not necessarily angularly disposed with respect to each other, and converge towards the chuck ends thereof. The drill bits 64 may be standard carbon steel bits and include a drilling portion 64a and a chucked portion 64b. A drill guide mechanism 70 is attached to each drill mount 28 adjacent the chucks 62 (see FIGS. 6–9).

The drill guide mechanism 70 consists of two sections. The first guide block 71 comprises a cap portion 71a, and base portion 71b secured by bolts 71c. The first guide block 71 also has arcuate guideways 72 extending therethrough as shown in FIGS. 6–8. The guideways 72 are formed by cooperating grooves 72a, 72b in the base and cap portions 71a and 71b respectively.

The second guide block 73 of the guide mechanism 70 consists of a base portion 73a, cap portion 73b and guide portion 73c secured by bolts 73d. The guide 73c has substantially parallel rectilinear guideways 74 extending therethrough. As shown in FIG. 6, the guideways 72 are struck on an arc "A" about a radius "R" having its center "C" on line "L" which forms an extension of rear face 75 of guide block 73. In this manner the drill bits are bent into parallel relationship on an arc having a fixed radius, said arc beginning at the rear face 76 of guide block 71 and ending at the rear face 75 of guide block 73. In this manner the guideways 72 and 74 serve to bend the converging drill bits into closely spaced substantially parallel relationship with each other. Thus it will be seen that holes can be drilled on much closer centers than would be possible if the drills were mounted in contiguous parallel relationship without the orienting guide mechanism 70. For example, if the drills of the present embodiment were mounted in contiguous parallel relationship, the holes drilled would be spaced a distance twice the radius of the largest cross section thereof or 1.50 inches. By providing a drill guide of the type shown, however, holes may be drilled on much closer centers than would be possible without the guide.

The first guide block 71 is made of brass so that it acts as a heat sink to dissipate the heat generated by any friction between the drill bits and the walls of the guideways 72.

The workpiece "W" to be drilled is mounted on support block 78 and clamped by pivoted clamps 80 (see FIG. 1A). The clamps are pivoted at 81 and actuated by fluid rams 82 which have abuting portions 84 adapted to move the clamps 80 into clamping position. The rams 82 are fluid actuated through medium of hoses 88 and are spring returned. The clamps 80 have counterweights 86 which act against the force of the pistons 82 and serve to bias the clamps upwardly when the pistons 82 are retracted. And air tube 90 having an orifice 92 is provided on each drill mount 28 to blow away the shavings left from the drilled holes in workpiece "W."

In operation two pairs of drills are usually mounted so as to drill two pairs of holes at opposite ends of a workpiece. Actuation of an operating valve (not shown) initiates the cycle of operation, setting the clamps 80 and putting the drills into operation. The drill chucks are extended and rotated simultaneously although these two operations could be done sequentially. The drill guides 72, 74 act to bend the converging drill bits 64 into substantially parallel closely spaced relationship so as to enable each pair of drills 30 to simultaneously drill a pair of closely spaced holes. The air tubes 90 act to blow away excess shavings. The drill bits are subsequently retracted, and the workpiece "W" is removed.

The pairs of drills can be adjusted inwardly and outwardly by loosening bolts 35 and moving the rear support plates 24 through the pin and slot connection 32, 34. The pairs of drills can be angularly adjusted by loosening bolts 40 and moving front support plate 26 along slots 36. The depth of penetration of the drills is adjusted by moving the drill mount 28 with respect to front support plate 26 through the medium of screw 46 and threaded block 50.

It will be seen from the above that a device has been provided which is adapted to drill a plurality of closely spaced holes and which may be easily adjusted to adapt it to different sizes and shapes of workpieces.

While an exemplary embodiment of the invention has been described, the scope of the invention is to be determined from the following claims.

What is claimed is:
1. A drilling mechanism comprising:
 at least two pairs of drills; each drill including a chucking member and a drill body;
 drill bits carried by said chucking members;
 each of said drill bits including an end drilling portion and a chucked portion;
 drill mounts for mounting the drills of each pair in angular relationship to each other such that the drills converge in the direction of the chucking member;
 guide blocks mounted on each drill mount adjacent the chucking members of the drills;
 said guide blocks having guideways extending therethrough;
 said guideways being adapted to guide and orient said drill bits so that the end portions of said bits are spaced apart in closely spaced substantially parallel relationship, and means for supporting the drill mounts for adjustable movement in three directions.

2. The device set forth in claim 1 wherein the means for supporting said drill mount include:
 a base assembly means;
 first supporting means carried by and slidable on said base assembly means along a rectilinear path;
 second support means carried by and slidable along said first support means in a curvilinear path;
 and said drill mount being carried by and slidable on said second support means in a rectilinear path.

3. A drilling mechanism set forth in claim 1 wherein the first guide block is made of brass to act as a heat sink to dissipate any heat generated by any friction between the drill bits and the guideways.

References Cited by the Examiner

UNITED STATES PATENTS

| | | | |
|---|---|---|---|
| 1,020,359 | 3/1912 | Lane | 77—22 |
| 1,083,202 | 12/1913 | Dusha et al. | 77—22 |
| 2,128,518 | 8/1938 | Van Veen | 77—22 |

FRANCIS S. HUSAR, *Primary Examiner.*